United States Patent [19]

Takeuchi et al.

[11] Patent Number: 5,072,816
[45] Date of Patent: Dec. 17, 1991

[54] AIR FEEDER FOR A PULL TYPE CLUTCH ASSEMBLY

[75] Inventors: Hiroshi Takeuchi; Kimio Mizuguchi, both of Neyagawa, Japan

[73] Assignee: Kabushiki Kaisha Daikin Seisakusho, Osaka, Japan

[21] Appl. No.: 477,863

[22] PCT Filed: Jul. 14, 1989

[86] PCT No.: PCT/JP89/00714
§ 371 Date: Apr. 6, 1990
§ 102(e) Date: Apr. 6, 1990

[87] PCT Pub. No.: WO90/01643
PCT Pub. Date: Feb. 22, 1990

[30] Foreign Application Priority Data

Aug. 9, 1988 [JP] Japan ............................. 63-105718

[51] Int. Cl.⁵ ............................................. F16D 13/72
[52] U.S. Cl. ............................. 192/70.12; 192/113 A
[58] Field of Search ................ 192/70.12, 70.27, 89 B, 192/113 A

[56] References Cited

U.S. PATENT DOCUMENTS 4,865,174 9/1989 Takeuchi ........................... 192/70.12
4,947,973 8/1990 Takeuchi ........................... 192/70.12

Primary Examiner—Rodney H. Bonck
Attorney, Agent, or Firm—Armstrong, Nikaido, Marmelstein, Kubovcik & Murray

[57] ABSTRACT

The invention relates to a pull type clutch for releasing the clutch by pulling the inside fulcrum part C3 of the diaphragm spring 8 rearward in the axial direction on the opposite side of the pressure plate side by the release bearing 12, in which an air feeder 18 is disposed on the rear surface of the diaphragm spring 8, and the mounting pedestals 27 of the air feeder 18 are affixed to the pressure plate 7 through the opening 17, and a protrusion 23 projecting to the diaphragm side is formed on the air feeder 18, and the intermediate fulcrum part C2 of the diaphragm spring 8 is held between the protrusion 23 and the fulcrum land 10 of the pressure plate 7. Thereby, smoothness of the release action and prevention of accompanying rotation in release state may be achieved.

1 Claim, 1 Drawing Sheet

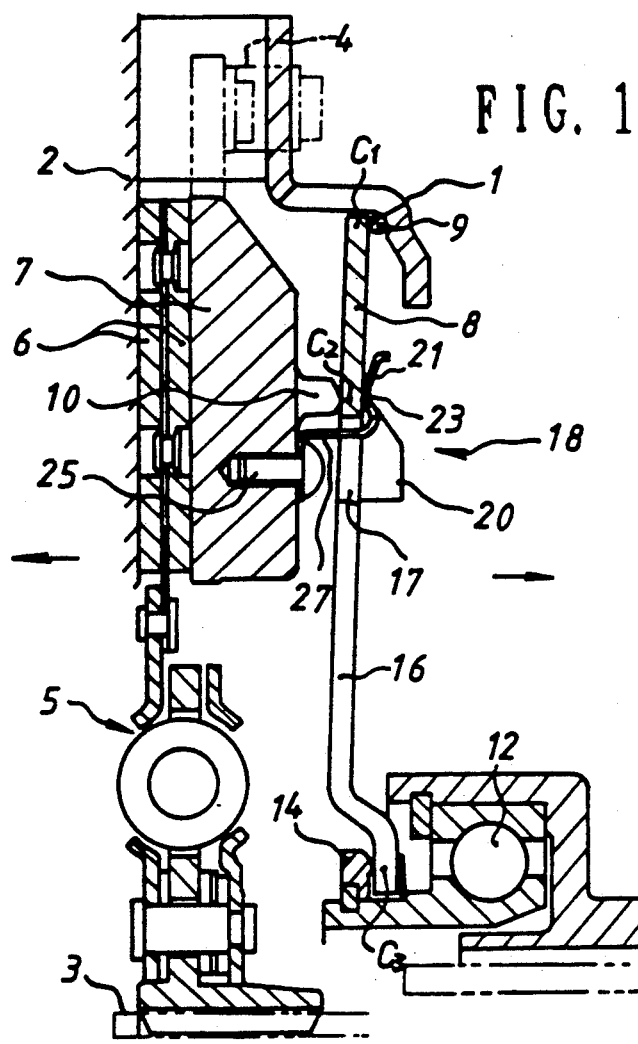
FIG. 1
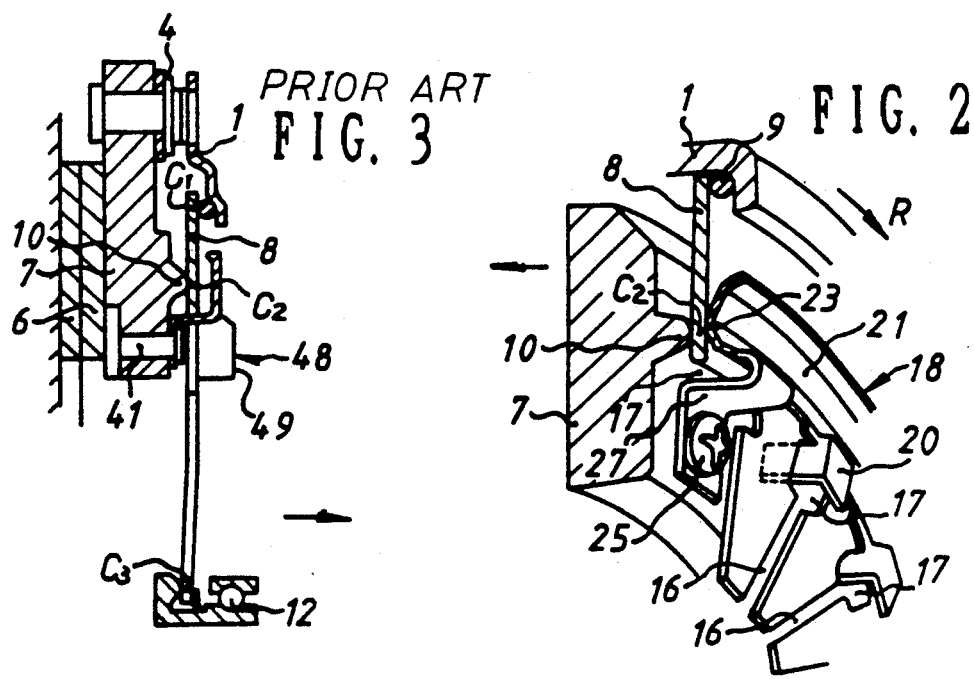
PRIOR ART
FIG. 3
FIG. 2

AIR FEEDER FOR A PULL TYPE CLUTCH ASSEMBLY

DESCRIPTION

1. Technical Field

The present invention relates to a pull type clutch for releasing the clutch by pulling a release bearing rearward in the axial direction on the opposite side of a pressure plate side, comprising a diaphragm spring having an extended opening disposed at an outward end portion of a radial slit, supporting the outside fulcrum part of the diaphragm spring by a clutch cover, abutting the intermediate fulcrum part to the fulcrum land of the pressure plate, and supporting the inside fulcrum part with the release bearing.

2. Background Art

In the pull type clutch of this sort, an outside fulcrum part C1 of a diaphragm spring 8 is, as shown in FIG. 3, supported on a clutch cover 1, an intermediate fulcrum part C2 abuts against a fulcrum land 10 of a pressure plate 7, and an inside fulcrum part C3 is engaged with a release bearing 12. The pressure plate 7 and clutch cover 1 are linked together by way of an elastic strap plate 4 so as to be rotatable as one body, and by pulling the inside fulcrum part C3 rearward by a release bearing 12, the pressure plate 7 moves backward by the elasticity of the strap 4, thereby disengaging the clutch.

Besides, in order to sent a cooling air to the pressure plate 7, an air feeder 48 having an air scoop portion is provided, and air is introduced into the pressure plate 7 area from outside through the feeder 48.

In such conventional structure, however, while the clutch is released, the pressure plate vibrates in the axial direction, due to engine vibrations, which may cause the pressure plate 7 to contact and rotate facing 6.

It is, hence, a primary object of the invention to securely move the pressure plate in the clutch releasing directly and eliminate the phenomenon of accompaying rotation due to engine vibration by specifically shaping the air feeder.

DISCLOSURE OF INVENTION

Technical Means

To achieve the above object, the invention presents a pull type clutch for releasing the clutch by pulling a release bearing rearward in the axial direction on the opposite side of a pressure plate side, comprising a diaphragm spring having an extended opening disposed at an outward end portion of a radial slit, supporting the outside fulcrum part of the diaphragm spring by a clutch cover, abutting the intermediate fulcrum part to the fulcrum land of the pressure plate, and supporting the inside fulcrum part with the release bearing, wherein an air feeder is disposed on the rear surface of the diaphragm spring with the mounting pedestal of the air feeder is affixed to the pressure plate through the opening, in the diaphragm spring. A protrusion, projecting onto the diaphragm spring side, is formed on the air feeder. The intermediate fulcrum part of the diaphragm spring is held between the protrusion and the fulcrum land of the pressure plate.

Operation

When the release bearing is pulled rearward to release the clutch, the diaphragm spring is moved (deformed) rearward around the fixed point of the outside fulcrum part. Because the intermediate fulcrum part of the diaphragm spring is held on the fulcrum land of the pressure plate and because of the protrusion of the air feeder, the pressure plate moves rearward together with the diaphragm spring, so that the clutch is securely disengaged.

Besides, since the pressure plate is always in contact with the diaphragm spring, contact between the clutch disc and the pressure plate, due to engine vibrations, is prevented, and simultaneous rotation is prevented.

While the clutch is rotating, meanwhile, the air feeder takes in the air from outside the scoop portion and supplies such air to the pressure plate to cool the pressure plate.

BRIEF DESCRIPTION OF DRAWINGS

FIG. 1 is a longitudinal sectional view of a pull type clutch according to the invention, FIG. 2 is a partial perspective view of FIG. 1, and FIG. 3 is a longitudinal sectional view of prior art.

BEST MODE FOR CARRYING OUT THE INVENTION

In FIG. 1 showing a pull type clutch according to the invention, a clutch disc 5 has its inner spline hub spline fitted to an output shaft 3, and a facing 6 is formed on the outer circumference of the clutch disc 5. At the front side (the engine side) of the facing 6, a flywheel 2 is disposed. A pressure plate 7 is located at its rear side. Pressure plate 7 is linked and supported on a clutch cover 1 so as to be movable in the axial direction by, for example, plural elastic straps 4, and is thrust rearward (to the clutch disengaging side) by the elasticity of straps 4. The clutch cover 1 is linked to the outer end portion of the flywheel 2 and is extended rearward, and covers the pressure plate 7 and others outward in the radial direction. The diaphragm spring 8 is disposed at the rear side of the pressure plate 7, and its outside fulcrum part C1 is supported on the bending part of the clutch cover 1 through a ring 9. The intermediate fulcrum part C2 abuts against a fulcrum land 10 of the pressure plate, while the inside fulcrum part C3 is engaged with a release bearing 12. Plural fulcrum lands 10 are formed on pressure plate 7 at intervals in the circumferential direction.

At the rear side of the diaphragm spring 8, an air feeder 18, having an air scoop part 20, is disposed.

In FIG. 2 showing a perspective view of FIG. 1, the diaphragm 8 possesses multiple radial slits 16, and an extended opening (slot) 17 is formed at the outer end in the radial direction of each slit 16.

The air feeder 18 has plural mounting pedestals 27 and plural air scoop parts 20 integrally formed at the inner side of an annular main body 21, and the mounting pedestals 27 and scoop parts 20 are located at positions corresponding to the opening 17. The mounting pedestals 27 are located, for example, at positions corresponding to every second opening 17, while the scoop parts 20 are situated at positions corresponding to the opening 17 between the mounting pedestals 27. The air scoop parts 20 are formed so as to bulge out rearward, and the end part of the rotating direction R side and the end part of the inner side are open, and the inside communicates with the pressure plate side (front side) through the opening 17. The mounting pedestals 27 reach the surface of the pressure plate 7 (rear side) through the opening 17, and are affixed to the pressure plate 7 with setbolts 25.

The sectional shape of the annular main body 21 is formed to incline toward the diaphragm spring side (front side) as going inward, and an annular protrusion 23 in a front projecting shape is formed at a position corresponding to the intermediate fulcrum part C2, and the intermediate fulcrum part C2 of the diaphragm spring 8 is held between the protrusion 23 and the fulcrum land 10 of the pressure plate 7.

The operation is described herein. When releasing the clutch, by pulling the release bearing 12 rearward, the diaphragm spring 8 is moved rearward around the outside fulcrum part C1. Since the diaphragm spring 8 is held between the protrusion 23 of the air feeder 18 and the fulcrum land 10 of the pressure plate 8, the pressure plate 8 is moved rearward together with the diaphragm spring 8 by the rearward pulling force of the diaphragm spring 8 in addition to the rearward returning force of the strap plate 4, so that the clutch is disengaged.

The pressure plate 7 is always in contact with the diaphragm spring 8 and is supported, and therefore vibration of the pressure plate 7 due to engine vibrations is impeded, and contact between the facing 6 and pressure plate 7 due to engine vibrations does not occur, and accompanying rotation is prevented.

During rotation of the clutch, meanwhile, air is taken in from the opening at the rotating direction side of the air scoop part 20 by rotation in the direction of arrow R in FIG. 2, and the air is supplied into the pressure plate 7 through the opening 17, thereby cooling the pressure plate.

OTHER MODES FOR CARRYING OUT THE INVENTION (1) The number of mounting pedestals and scoop parts, and the layout pattern may be properly selected.

(2) The air feeder 18 of the illustrated embodiment possesses an annular main body 21, but the main body 21 may be divided into two or three sections and may be fixed to the diaphragm spring.

(3) It is also applicable to the clutch having twin type disc.

Effects of the Invention

According to the invention as described herein, (1) In the pull type clutch, since the protrusion 23 is formed in the air feeder 18 affixed to the pressure plate 7, and the intermediate fulcrum part C2 of the diaphragm spring 8 is held between the protrusion 23 and the fulcrum land 10 of the pressure plate 7, when releasing the clutch, the pressure plate 7 moves in the clutch disengaging direction together with the diaphragm spring 8, so that the clutch is securely disengaged.

That is, the clutch releasing action is done securely.

(2) Since the pressure plate 7 always contacts with the diaphragm spring 8 and is supported, the pressure plate 7 is not oscillated in the axial direction due to the engine vibration, and the contact between the facing 6 and pressure plate 7 is prevented, and accompanying rotation phenomenon in clutch release action is prevented.

In particular it is optimal for prevention of accompanying rotation of the twin type clutch having a pair of clutch discs.

(3) Since the diaphragm spring 8 is held against the fulcrum land 10 of the pressure plate 7 by making use of the air feeder 18, it is not necessary to install new members for supporting purpose in particular, so that the number of parts may be saved.

In other words, as the part functioning same as the diaphragm holding clip of the push type clutch, the protrusion 23 is formed in the air feeder 18, and therefore the number of parts may be saved.

INDUSTRIAL APPLICABILITY

The pull type clutch assembly of the invention is suited to an automotive clutch, and the effect for prevention of simultaneous rotation is particularly notable when applied in a twin type clutch having a pair of clutch discs.

What is claimed is:

1. A pull type clutch assembly comprising a flywheel, a pressure plate, a clutch disc intermediate said flywheel and said pressure plate, a clutch cover fixed to said pressure plate by elastic straps, and a release bearing, a diaphragm spring having circumferentially extending openings at an outer end portion of radial slits passing through said diaphragm spring, said diaphragm spring having a front surface facing said pressure plate and a rear surface facing away from said pressure plate, an outside fulcrum at a radial end portion of said rear surface of said diaphragm spring in engagement with said clutch cover, an intermediate fulcrum on said front surface of said diaphragm spring engaging a fulcrum land on said pressure plate and an inside fulcrum at a radial inner end portion of said rear surface of said diaphragm spring in engagement with said release bearing, and an air feeder disposed on said rear surface of said diaphragm spring and mounted on mounting pedestals passing through spaced of said circumferential openings and affixed at inner ends to said pressure plate and air scoops intermediate said pedestals and projecting rearwardly of said rear surface of said diaphragm spring for directing air through said circumferentially extending openings, said air feeder having means engaging said diaphragm spring for clamping said diaphragm spring between said air feeder and said fulcrum land on said pressure plate and for holding said diaphragm spring in engagement with said fulcrum land.

* * * * *